Dec. 12, 1939.  J. T. GIBBS ET AL  2,183,452
AIR CONDITIONER FOR AUTOMOBILES, BUSES, AND THE LIKE
Filed March 12, 1938  3 Sheets-Sheet 1

Inventors
J. T. Gibbs
& W. P. Young
By Watson E. Coleman
Attorney

Dec. 12, 1939.  J. T. GIBBS ET AL  2,183,452
AIR CONDITIONER FOR AUTOMOBILES, BUSES, AND THE LIKE
Filed March 12, 1938  3 Sheets-Sheet 2

Inventors
J. T. Gibbs
W. P. Young
By Watson E. Coleman
Attorney

Dec. 12, 1939.    J. T. GIBBS ET AL    2,183,452
AIR CONDITIONER FOR AUTOMOBILES, BUSES, AND THE LIKE
Filed March 12, 1938    3 Sheets-Sheet 3
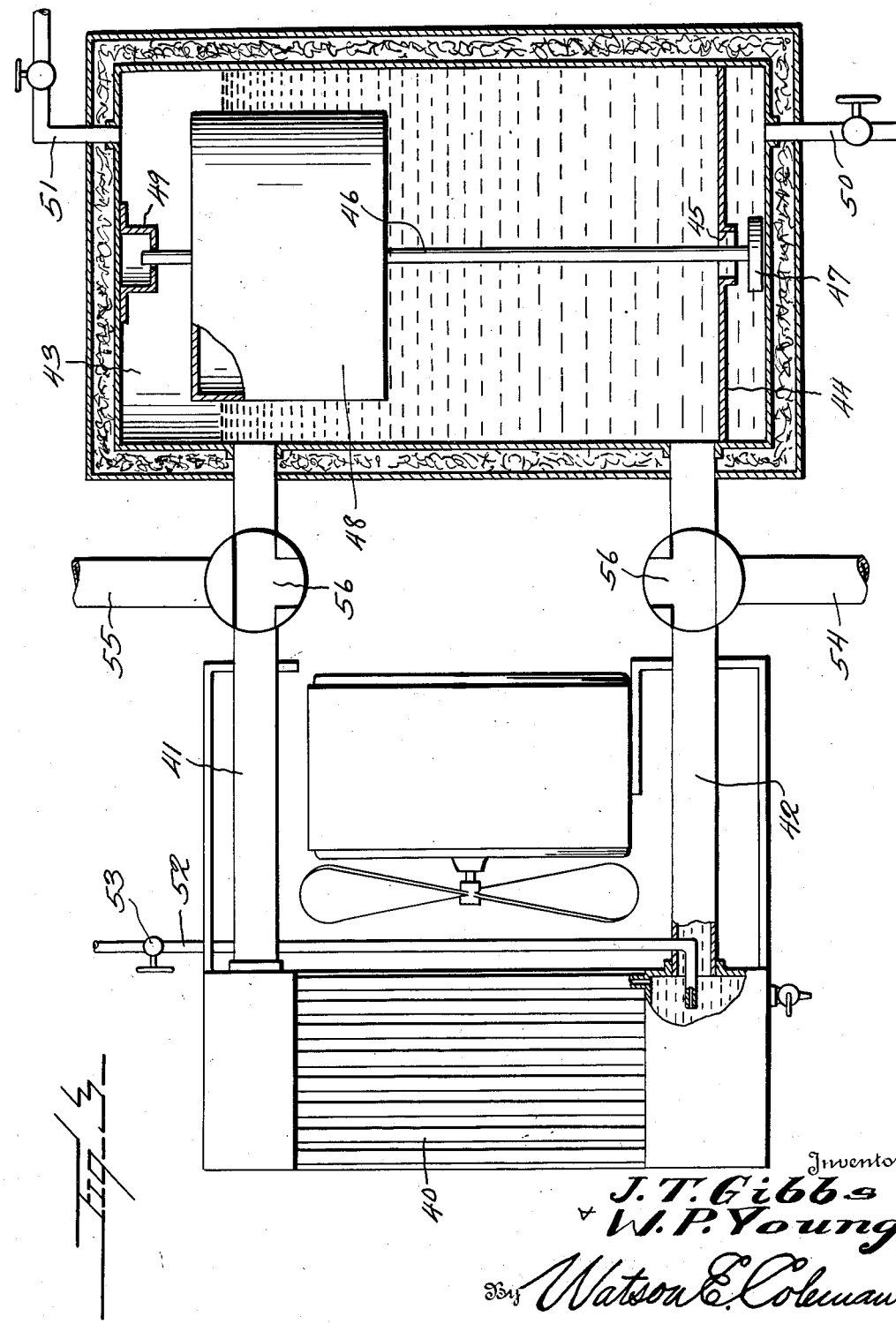

Patented Dec. 12, 1939

2,183,452

UNITED STATES PATENT OFFICE 2,183,452

AIR CONDITIONER FOR AUTOMOBILES, BUSES, AND THE LIKE

James T. Gibbs and William P. Young, Sweetwater, Tenn.

Application March 12, 1938, Serial No. 195,643

2 Claims. (Cl. 62—169)

This invention relates to heat transfer apparatus and particularly to means for conditioning the air within a passenger carrying compartment of an automotive vehicle.

The general object of my invention is to provide a system whereby the air within the passenger compartment of an automobile may be cooled, wherein the evaporation of a highly volatile liquid may be used as a refrigerating medium, such liquid being preferably engine fuel such as gasoline or other volatile fuels, and in which this liquid is volatilized by the suction at the intake manifold of the engine, this volatilization being assisted by the agitation and atomization caused by a stream of air entering the chamber containing the refrigerant and bubbling up through the refrigerant.

Another object is to provide a structure of this character which includes a radiator, means for projecting air past the radiator into the passenger carrying compartment, means for cooling this air, and means whereby, if desired, circulation may be established between the main radiator of the automobile and the radiator in the passenger compartment so that warm water from the main radiator may be caused to circulate through the auxiliary radiator to thus heat the air discharged into the passenger compartment thus providing means whereby the air may be heated or cooled as necessity may require.

Other objects will appear in the course of the following description.

Our invention is illustrated in the accompanying drawings wherein:

Fig. 3 is an elevation of still another modification of the structure shown in Fig. 2, the evaporation chamber and its non-conducting wall being shown in section.

Two forms of our invention are shown in the assembly drawings, one of the forms being an indirect system wherein refrigerant, as for instance, a liquid cooled by evaporation, cools a liquid which circulates through the cooling radiator, and in the other form the liquid refrigerant, cooled by evaporation, is itself caused to circulate through the cooling radiator.

Figure 1:
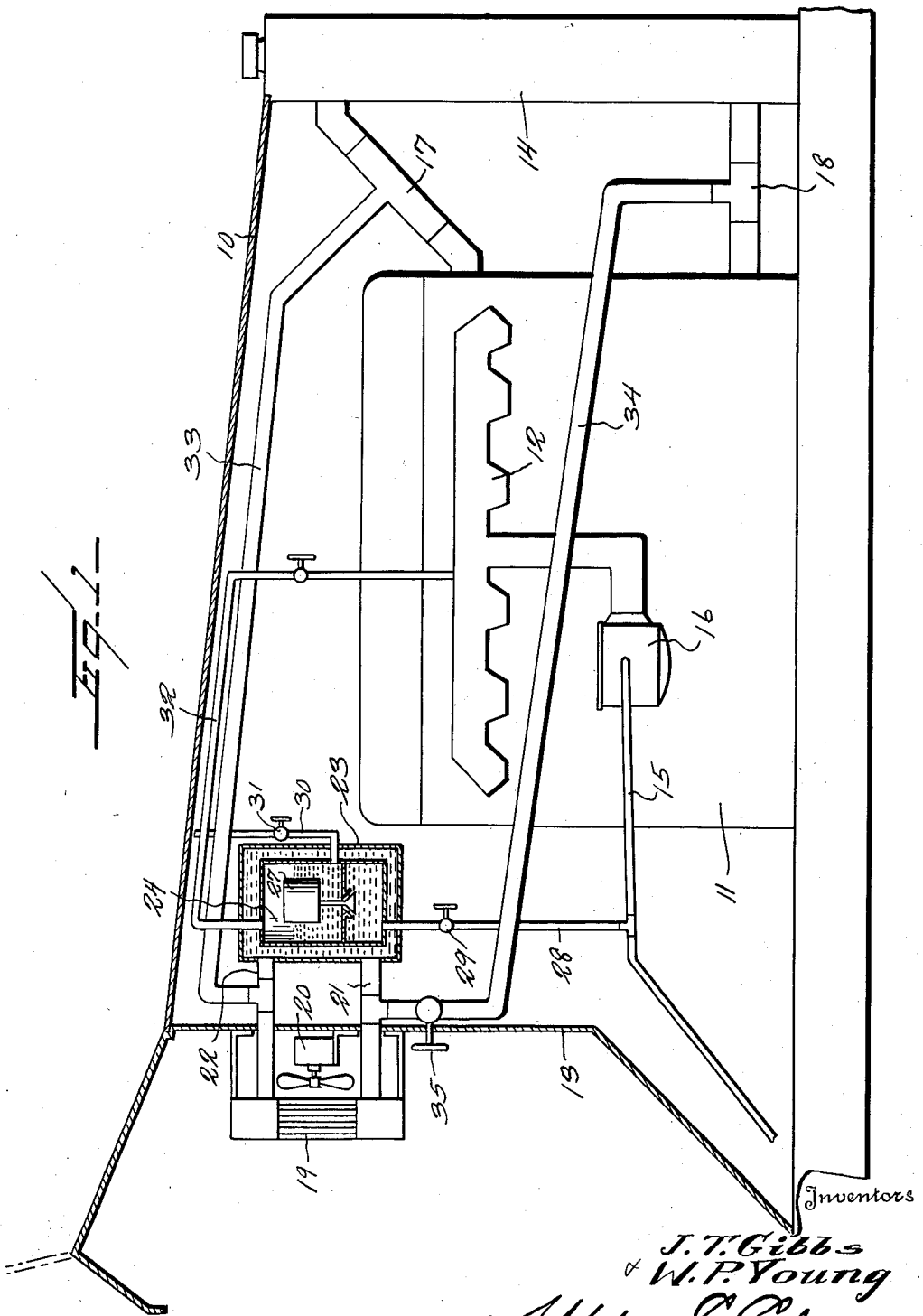
Fig. 1 is a longitudinal section through an automobile engine hood, the main radiator, the engine and the cooling radiator being in elevation, the evaporation chamber and its jacket being in section.

Referring now to Fig. 1, 10 designates the hood of an automobile enclosing the engine 11 and having the usual intake manifold 12. The partition separating the passenger space from the engine compartment is designated 13 and the usual radiator at the forward end of the machine is designated 14. The fuel line 15 for the engine enters the usual carbureter 16 which is connected by the usual pipe to the intake manifold 12 of the engine. A pipe 17 connects the water jacket of the engine to the upper end of the radiator 14 and a pipe 18 connects the lower end of the radiator 14 to the engine water jacket, thus securing a circulation of water from the engine jacket through the radiator and back to the engine jacket as is usual. So far, all of the parts referred to are those commonly found in connection with automobile engines.

Disposed within the passenger compartment and shown as mounted on the dashboard 13 is an air cooling radiator 19. Behind this is mounted an electric fan 20, the motor of which is designated M. The radiator 19 may be of any suitable character and the air therefore is blown past the radiator by the fan in order to cool this air. Tubes (preferably of copper) designated 21 and 22 lead from the lower and upper ends of the radiator 19 to the lower and upper ends of a water jacket 23 surrounding and defining an evaporating chamber 24 designed to contain a highly volatile liquid. The lower end of chamber 24 is provided with a septum 25 having a valve seat with which an upwardly closing valve 26 coacts. This valve is connected by a rod to a float 27 in the upper portion of the chamber 24. A copper tube 28 leads from the fuel supply line 15 to the lower end of the evaporating chamber 24 and is provided with a valve 29. An air inlet pipe 30 leads into the chamber 24 just above the septum 25 and has a valve 31 whereby the flow of air through this air pipe may be very delicately regulated and controlled. It is designed that this valve shall be set to secure the desired flow and then remain in this position until a resetting of the valve is necessary.

From the upper end of chamber 24 leads a small tube 32 (preferably of copper) which connects with the intake manifold. It will be plain, therefore, that the partial vacuum in the intake manifold will cause air to be drawn into the liquid fuel in the evaporating chamber 24, that this will cause rapid evaporation of the fuel as the air is drawn upward through the liquid fuel, and that the vaporized fuel will absorb heat from the liquid fuel and from the water jacket surrounding the evaporating chamber. This more or less heated fuel vapor and the air will be carried into the engine manifold and pass into the engine with the usual charge. Of course, the carbureter 16 will be so regulated as to compensate for this excess vapor carried to the engine.

The evaporation of the liquid in chamber 24 will cool the refrigerant liquid in the chamber 24 and thus cool the water in the water jacket. The water in the jacket 23 will circulate through the radiator 19 by means of the pipes 21 and 22 and cool the air blown through the radiator by the fan 20.

In Fig. 1, we have also illustrated the discharge pipe 22 from radiator 19 as being connected by pipe 33 to the pipe 17 leading from the engine jacket to the upper end of the main radiator 14, and a pipe 34 connecting the pipe 18 with the cold water inlet pipe 21 for radiator 19, this pipe 34 having therein the shut-off valve 35. Thus when the valve 35 is open, there will be a circulation of water from the main radiator 14 through the radiator 19. Of course, when the valve 35 is closed, there will be no such circulation to and from the main radiator 14.

Figure 2:
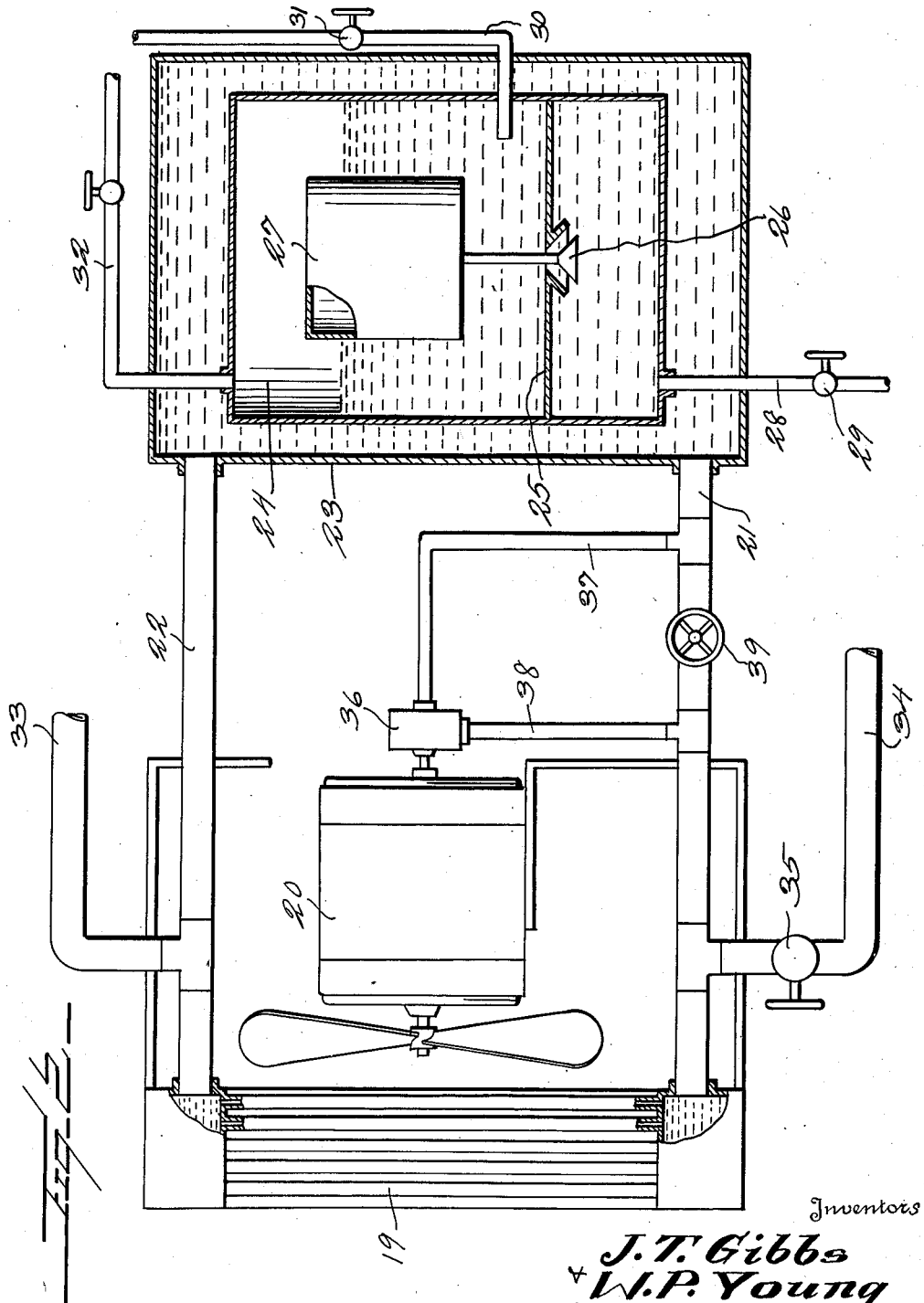
Fig. 2 is an enlarged view of the cooling radiator, the evaporation chamber and allied parts, the evaporation chamber and its jacket being in section and this view showing a slight modification from the structure shown in Fig. 1.

In Fig. 2, we illustrate a slight modification of the mechanism shown in Fig. 1, consisting in disposing a pump 36 behind the motor M to be driven by said motor. The intake pipe 37 of this pump is connected to pipe 21, the outlet pipe from the pump being also connected to the pipe 21. A valve 39 is disposed in the pipe line 21 between the two pipes 37 and 38. When this valve is closed, the liquid from the jacket 23 is by-passed through the pump and thus a forced circulation of cooling water is secured from the jacket 23 through the radiator 19 and then back to the jacket 23. When the valve 39 is opened, the refrigerant flows directly from the jacket 23 into the radiator 19 and back to the jacket.

In Fig. 3, another form of our installation or system is illustrated in which the refrigerant instead of being used to cool the water in a water jacket passes directly into the cooling radiator and back again to the evaporation chamber. In this form, the refrigerant contained in the evaporation chamber is itself used as the cooling medium. The radiator 40 is connected by pipes 41 and 42 to the interior of an evaporating chamber 43, the walls of which are of heat insulating material. Below the entrance pipe 42, the chamber has a septum 44 having a valve seat 45. The float valve rod 46 carries an upwardly closing valve 47 on its lower end and a float 48 adjacent its upper end. The upper end of the rod is guided by a guide 49 attached to the upper end of the evaporating chamber. A refrigerant inlet pipe 50 enters the lower end of chamber 43, passage through this pipe being controlled by a valve, and a pipe 51 corresponding with the pipe 32 in Fig. 1 extends from the chamber 43 to the intake manifold (not shown in Fig. 3) and is provided with a valve. An air inlet pipe, such as shown in Fig. 1 and designated 30, may enter the chamber 43 or as shown in Fig. 3, an air inlet pipe 52 may enter the lower end of the radiator 40, this pipe having the valve 53 whereby the amount of air entering the lower end of the radiator may be regulated. Pipes 54 and 55 (equivalent to pipes 33 and 34 in Fig. 1) may extend from the engine radiator and open into the pipes 40 and 42 and usual three-way valves 56 may be provided at the junction of the pipes 54 and 55 with the pipes 41 and 42, so that communication between the engine radiator and the radiator 40 may be entirely cut off or flow permitted. While we prefer to use three-way valves in this connection, we do not wish to be limited thereto as ordinary cut-off valves might be used.

The operation of the structure shown in Fig. 1 is as follows:

Assuming that it is desired to cool the air within the passenger compartment of the vehicle, the valve 35 is closed, thus preventing circulation of water from the main radiator 14 into the cooling radiator 19 or this valve 35 may be opened to permit a certain amount of the cold water from the radiator to pass into the pipe 21 and out from the pipe 22 so as to keep up the supply of water within the circulating system of the radiator 19. The refrigerant, preferably in the form of gasoline or other highly volatilizable motor fuel is permitted to pass from the supply pipe 15 into the evaporation chamber 24 and passes up through the central opening in the septum 25 into the upper portion of this evaporating chamber. When a sufficient amount of liquid is within the upper portion of the evaporation chamber, the float 27 rises and closes the valve 26. As the engine operates, a partial vacuum is created within the intake manifold 12 and this acts to vaporize the fuel or other refrigerant within the upper portion of chamber 24. This is further assisted by the drawing in of a stream of air through the pipe 30, which stream of air bubbles up through the liquid in chamber 24, causing the atomization of this liquid. The vaporization of the liquid in the chamber 24 acts to cool the body of the liquid and also to cool the surrounding water jacket 23, and this vapor which has absorbed heat and the air which has bubbled up through the refrigerant is drawn off through the pipe 32 to the engine manifold. A constant circulation of the cooled liquid occurs through the pipes 21 and 22 and the radiator 19. This cold liquid chills the air which is forced past the radiator 19 by the fan 20 and if requisite, as stated previously, the pump 36 may be used for causing a forcible circulation of cooled liquid through the radiator.

The operation of the structure shown in Fig. 3 differs from that shown in Figs. 1 and 2, merely by the fact that the refrigerant within the chamber 43 is itself circulated through the radiator 40 and that thus there is no water jacket around the chamber 43, but it is protected from heat losses by the insulated wall of the chamber. If it be desired to warm the air, the three-way valves 56 are turned so as to cut off the passage of refrigerant from the chamber 43 to the radiator and warm water from the engine radiator 14 is circulated through the pipes 54 and 55 and through the radiator 40. Thus it will be seen that we provide for either warming the air entering the passage of an automotive vehicle or cooling this air.

It is to be understood from what has gone before that we may either provide an air pipe such as the pipe 30 entering the evaporation chamber itself or we may provide an air pipe 52 as illustrated in Fig. 3, entering the radiator 40. We prefer, however, to have the air pipe enter and discharge air into the liquid within the evaporation chamber.

It is to be understood, of course, that in Figs. 1 and 2, there will be no flow or circulation of water from the main radiator of the engine except when it is desired to warm the air in the vehicle and that, under these circumstances, the valve 35 will be opened to permit the circulation of water from the main radiator 14 through these pipes 19, but when it is desired to cool this air as in summer, the valve 35 is closed and warm water will be drawn from the water jacket 23. Of course, when the air is being warmed by water drawn from the main radiator, the valve 29 in pipe 28 and the valve in pipe 32 will be shut so that no gasoline will be drawn from the tank 24. The same is true in Fig. 3. Under ordinary circumstances, when it is desired to cool the air, the valves 56 are in the position shown diagrammatically in Fig. 3, so that communication with pipes 54 and 55 is cut off, but when it is desired to use the radiator 40 for warming the air, the valves 56 are turned to shut off the gasoline tank 43 and communicatively connect the radiator 40 with the pipes 54 and 55. The object of the pipe 52 in Fig. 3 is to cause circulation of the chilled liquid and eliminate the necessity of a force pump such as is shown at 36 in Fig. 2.

While we have illustrated certain details of construction and certain arrangement of parts which we believe to be particularly effective, we do not wish to be limited thereto as obviously many changes in these details and arrangements might be made without departing from the spirit of the invention as defined in the appended claims.

What is claimed is:

1. An air cooling system, comprising a radiator including heat transfer tubes through which fluid is passed, means for effecting a circulation of air across said tubes, a fluid receptacle, connecting means between the top and bottom portion of said receptacle and said radiator whereby a closed fluid circuit is established through the receptacle, the conducting means and said tubes, a second receptacle within the first receptacle and surrounded by the fluid therein, a volatile fluid within said second receptacle, means for supplying volatile fluid to the second receptacle into the lower part thereof, a valve controlled apertured diaphragm within the second receptacle, float means controlling said valve whereby the introduction of fluid into the second receptacle is controlled to maintain a fluid free area in the upper part thereof, means for introducing air into the second-mentioned receptacle above said diaphragm and into the volatile fluid, and means for drawing off vapor from the fluid free upper portion of the second receptacle whereby to effect rapid evaporation of the volatile fluid and a reduction in the temperature of the same and of the fluid in the first receptacle.

2. An air cooling system for a vehicle having an internal combustion engine, including an evaporating chamber connected at its lower end with the fuel line of the engine and having its upper end connected with a suction line having connection with the fuel intake manifold of the engine, said evaporating chamber having an apertured diaphragm disposed therein to divide the chamber into an upper and a lower section, the lower section having the fuel line connection opening thereinto, a float in the upper section of the chamber, a valve connected with said float and disposed beneath the diaphragm to be moved, upon the raising of the float into closing relation with the aperture, a radiator containing liquid, the liquid being cooled by the evaporation of liquid fuel in the evaporating chamber, and means for admitting air from the atmosphere into the liquid of the evaporating chamber below the level of the fuel therein to pass through the chamber and to the suction line.

JAMES T. GIBBS.
WILLIAM P. YOUNG.